United States Patent
Sun et al.

(10) Patent No.: US 9,308,914 B1
(45) Date of Patent: Apr. 12, 2016

(54) ADVANCED DRIVER ASSISTANCE SYSTEM FOR VEHICLE

(71) Applicant: DENSO International America, Inc., Southfield, MI (US)

(72) Inventors: Bo Sun, Farmington Hills, MI (US); Katsuhiko Akamatsu, West Bloomfield, MI (US); Takayuki Nagai, West Bloomfield, MI (US)

(73) Assignee: Denso International America, Inc., Southfield, MI (US)

( * ) Notice: Subject to any disclaimer, the term of this patent is extended or adjusted under 35 U.S.C. 154(b) by 0 days.

(21) Appl. No.: 14/603,521

(22) Filed: Jan. 23, 2015

(51) Int. Cl.
| | |
|---|---|
| *B60W 30/08* | (2012.01) |
| *B60W 30/00* | (2006.01) |
| *B60W 30/09* | (2012.01) |
| *B60W 30/16* | (2012.01) |
| *B60W 30/12* | (2006.01) |
| *B60K 28/02* | (2006.01) |
| *B60K 28/06* | (2006.01) |
| *B60W 40/08* | (2012.01) |

(52) U.S. Cl.
CPC ............. *B60W 30/08* (2013.01); *B60W 30/00* (2013.01); *B60W 30/09* (2013.01); *B60W 30/12* (2013.01); *B60W 30/16* (2013.01); *B60K 28/02* (2013.01); *B60K 28/06* (2013.01); *B60W 2040/0818* (2013.01); *B60W 2540/22* (2013.01); *B60W 2540/26* (2013.01)

(58) Field of Classification Search
CPC .................. B60K 28/02; B60K 28/06; B60W 2040/0818; B60W 2540/22; B60W 2540/26; B60W 30/08; G08G 1/166; G08G 1/167
See application file for complete search history.

(56) References Cited

U.S. PATENT DOCUMENTS

| | | | |
|---|---|---|---|
| 6,945,346 B2 * | 9/2005 | Massen | B60K 31/0008 180/169 |
| 2004/0020698 A1 * | 2/2004 | Gehrke | B60K 31/0008 180/170 |

(Continued)

FOREIGN PATENT DOCUMENTS

| | | | | |
|---|---|---|---|---|
| DE | 102006039682 A1 * | 2/2008 | | B60K 28/066 |
| DE | 102012008090 A1 * | 10/2013 | | G08G 1/167 |

(Continued)

OTHER PUBLICATIONS

EPO machine translation of DE 102006039682 (original DE document published Feb. 28, 2008).*

*Primary Examiner* — Behrang Badii
*Assistant Examiner* — David Testardi
(74) *Attorney, Agent, or Firm* — Harness, Dickey & Pierce, P.L.C.

(57) ABSTRACT

An advanced driver assistance system of a vehicle for performing one or more driver assistance features includes an environmental sensor, a driving status monitor, an activation switch, and a driver assistance controller. The environmental sensor detects an environment surrounding the vehicle. The driver status monitor monitors the driver and determines an abnormal situation of the driver. The activation switch is operable by the driver for activating or deactivating the driver assistance features. The driver assistance controller performs the one or more driver assistance features for controlling the vehicle based on a target behavior, where the target behavior is defined based on the environment surrounding the vehicle. The driver assistance controller activates the driver assistance features when the driver status monitor detects the abnormal situation with the activation switch set to deactivate.

12 Claims, 10 Drawing Sheets

(56) References Cited

U.S. PATENT DOCUMENTS

| | | | | |
|---|---|---|---|---|
| 2010/0222976 | A1* | 9/2010 | Haug | B60K 28/04 701/70 |
| 2011/0245992 | A1* | 10/2011 | Stahlin | B60W 50/085 701/1 |
| 2012/0025993 | A1* | 2/2012 | Akiyama | A61B 5/18 340/576 |
| 2012/0212353 | A1* | 8/2012 | Fung | B60K 28/06 340/905 |
| 2013/0335213 | A1* | 12/2013 | Sherony | G08G 1/167 340/439 |
| 2014/0074338 | A1* | 3/2014 | Nordbruch | B60W 40/08 701/23 |
| 2014/0371981 | A1* | 12/2014 | Nordbruch | G07C 5/0841 701/36 |

FOREIGN PATENT DOCUMENTS

| | | | | | |
|---|---|---|---|---|---|
| GB | 2500690 | A | * | 10/2013 | ............... A61B 5/18 |
| JP | 10-315800 | | | 12/1998 | |
| JP | 10315800 | A | * | 12/1998 | |
| JP | 2007299048 | A | * | 11/2007 | |
| JP | 2008-037201 | | | 2/2008 | |
| JP | 2008-097278 | | | 4/2008 | |
| JP | 2009116693 | A | * | 5/2009 | |
| JP | 2011238130 | A | * | 11/2011 | |
| JP | 2011238133 | A | * | 11/2011 | |
| JP | 2014-044707 | | | 3/2014 | |
| WO | WO 02/096694 | A1 | * | 12/2002 | |

* cited by examiner

ADVANCED DRIVER ASSISTANCE SYSTEM FOR VEHICLE

FIELD

The present disclosure relates to an advanced driver assistance system (ADAS) for a vehicle.

BACKGROUND

This section provides background information related to the present disclosure which is not necessarily prior art.

In recent years, development of an advanced driver assistance system (ADAS) for a vehicle has increased. An ADAS includes driver assistance features such as a pre-collision safety (PCS), an adaptive cruise control (ACC), and/or a lane keeping assist (LKA). These driver assistance features are built into the subject vehicle to help the driver avoid a collision, follow a preceding vehicle, and/or keep the subject vehicle in its lane. The ADAS are equipped with one or more sensors, such as an imaging camera, a millimeter-wave/laser radar, and/or a sonar sensor. The sensors detect an environment surrounding the subject vehicle including an approaching object, a crossing pedestrian, a preceding vehicle, and/or lane markers. Based on the environment detected by the sensors, the ADAS controls the subject vehicle automatically by actuating throttle, brake and/or steering to avoid accidents.

Japanese Unexamined Patent Publication No. H10-315800 discloses a driver assistance device equipped with an alterness sensor. The driver assistance device controls a vehicle automatically based on an alterness of the driver which can be detected by one or more sensors. If the alterness level falls below a predefined threshold, the driver assistance device automatically actuates throttle, brake, and/or steering to keep the vehicle running safe or to pull the vehicle to the shoulder of the road.

Generally, the driver can activate or deactivate the driver assistance features individually by, for example, operating a switch which may be disposed at a steering wheel. If the driver turns off the driver assistance feature before starting to drive, the ADAS will not operate until the driver turns on the driver assistance feature. Accordingly, even in a situation in which the driver is distracted or not alert, the ADAS will not operate.

SUMMARY

This section provides a general summary of the disclosure, and is not a comprehensive disclosure of its full scope or all of its features.

According to one aspect of the present disclosure, an advanced driver assistance system of a vehicle for performing one or more driver assistance features includes an environmental sensor, a driving status monitor, an activation switch, and a driver assistance controller. The environmental sensor detects an environment surrounding the vehicle. The driver status monitor monitors the driver and determines an abnormal situation of the driver. The activation switch is operable by the driver for activating or deactivating the driver assistance features. The driver assistance controller performs the one or more driver assistance features for controlling the vehicle based on a target behavior, where the target behavior is defined based on the environment surrounding the vehicle. The driver assistance controller activates the driver assistance features when the driver status monitor detects the abnormal situation with the activation switch set to deactivate.

According to another aspect of the present disclosure, a method for controlling an advanced driver assistance system of a vehicle for performing one or more driver assistance features includes steps of detecting, monitoring, receiving, performing, and activating. The determining step determines an environment surrounding the vehicle. The monitoring step monitors the driver and determines an abnormal situation of the driver. The receiving step receives a signal from an activation switch operable by the driver for activating or deactivating the driver assistance features. The performing step performs the one or more driver assistance features for controlling the vehicle based on a target behavior, where the target behavior is defined based on the environment surrounding the vehicle. The activating step activates one or more driver assistance features when the activation switch is set to deactivate and the abnormal situation is determined.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1:
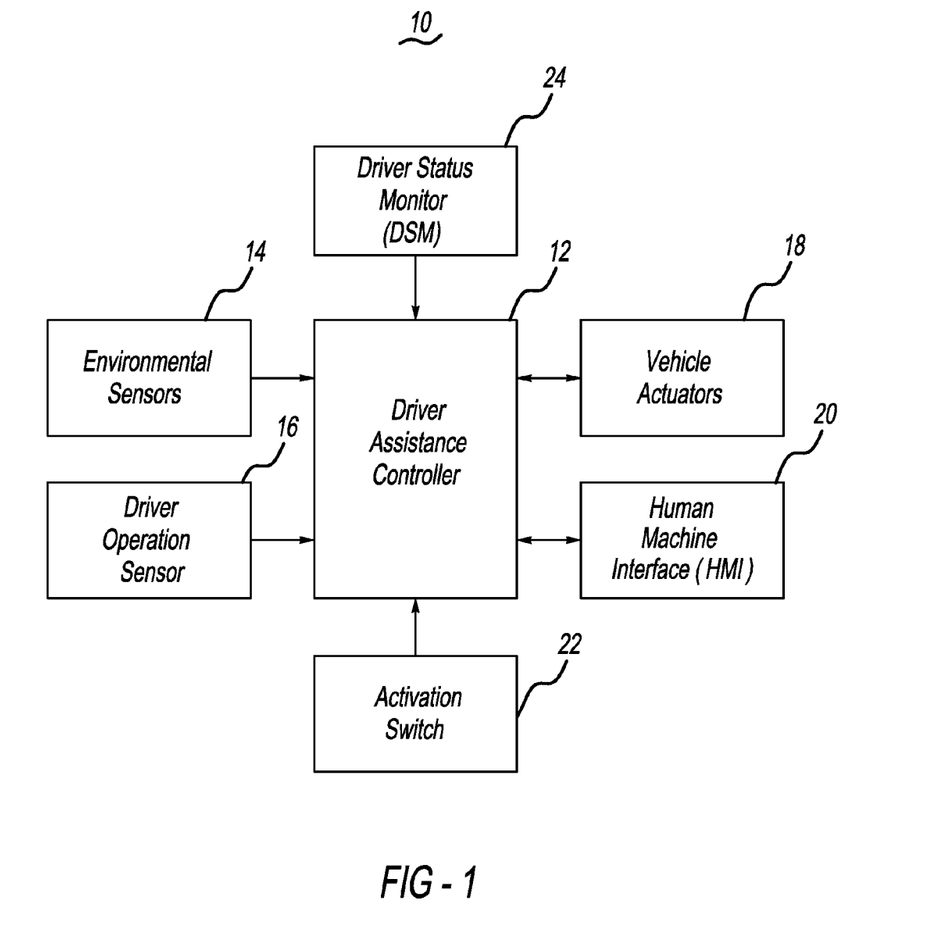
FIG. 1 is a block diagram of an advanced driver assistance system (ADAS)

Referring to FIG. 1, an advanced driver assistance system (ADAS) 10 is shown. The ADAS 10 is a system for assisting the driver to drive the vehicle safely by performing one or more driver assistance features. The ADAS 10 includes a driver assistance controller 12, one or more environmental sensors 14, driver's operation sensors 16, vehicle actuators 18, human machine interfaces (HMIs) 20, an activation switch 22. In addition, the ADAS 1 further includes a driver status monitor (DSM) 24 for determining whether the driver is undergoing an abnormal situation. For example, the DSM 24 determines if the driver is distracted, sick, drowsy, etc.

The driver assistance controller 12 is an electric control unit (ECU) which includes, for example, a processor, a memory, and an interface. The processor processes data received from sensors and executes an application program to perform the driver assistance features. The memory includes a random access memory (RAM) which stores temporary data to be processed by the processor and a read only memory (ROM) which stores the application program to be executed by the processor. The interface communicates data with sensors, actuators, and other devices in the vehicle directly or via the vehicle network bus. The driver assistance controller 12 may be separated into two or more different units.

Figure 2:
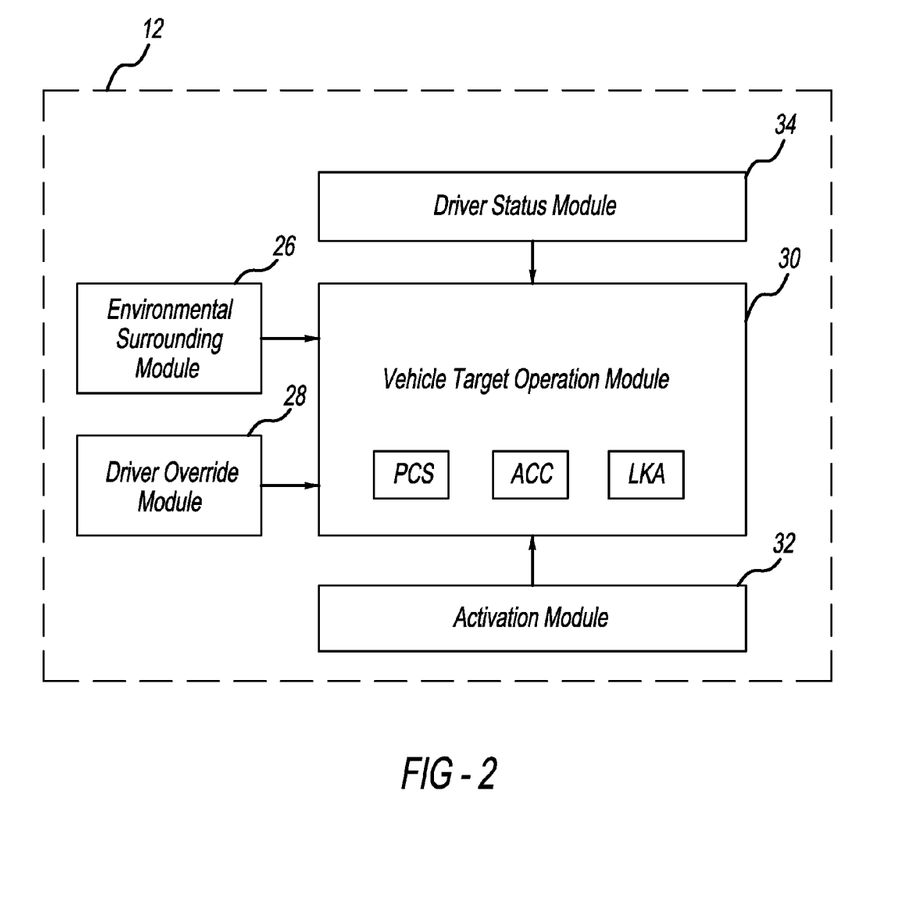
FIG. 2 is a block diagram of a driver assistance controller.

Referring to FIG. 2, the driver assistance controller 12 includes functional modules such as an environmental surrounding module 26, a driver override module 28, a vehicle target operation module 30, an activation module 32, and a driver status module 34.

Figure 3:
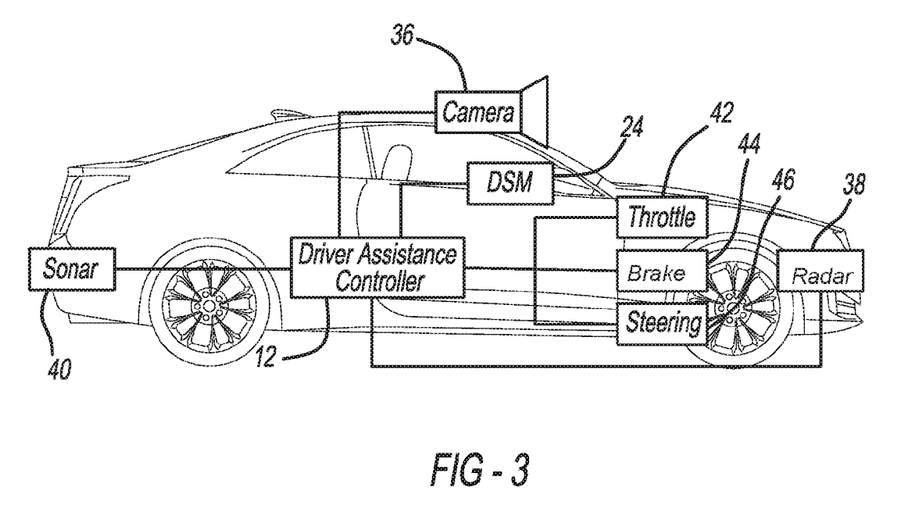
FIG. 3 illustrates a vehicle equipped with ADAS.

The environmental surrounding module 26 receives environmental data from the environmental sensors 14 to detect an environment surrounding the vehicle. The environmental sensors 14 detect, for example, an approaching object, a crossing pedestrian, a preceding vehicle, and/or unintended departure from the traveling lane. The environmental sensors 14 are installed outside and/or inside of the vehicle. As shown in FIG. 3, the environmental sensors 14 include a camera 36, a radar 38, and/or a sonar 40. More specifically, the camera 36 may be a front-facing camera mounted inside of the vehicle at an upper portion of a windshield. The radar 38 may be millimeter-wave/laser radar mounted in a front bumper. The sonar 40 may be one or more ultrasonic sensors embedded in a rear bumper.

The driver override module 28 receives operation data from the driver operation sensors 16 to detect an override performed by the driver. Examples of an operation performed by the driver which indicates the override include depression of an acceleration pedal, depression of a brake pedal, and rotation of a steering wheel. The driver operation sensors 16 include a acceleration pedal sensor, a brake pedal sensor, and a steering wheel sensor. The acceleration pedal sensor and the brake pedal sensor may be position sensors installed in pedal modules to measure how much the driver accelerates or decelerates the vehicle. The steering wheel sensor may be a steering torque sensor installed in a steering wheel module to measure how much the driver steers the vehicle. The driver override module 28 has a degree threshold and a torque threshold to determine whether the driver is performing the override of the driver assistance features. For example, the degree of depression or the torque of steering exceeds the threshold value, the driver override module 28 sends a signal to deactivate or override the driver assistance features.

The vehicle target operation module 30 receives the environmental data and the operation data to calculate a target behavior suitable for the environment. Depending on the target behavior, the vehicle target operation module 30 controls the vehicle actuators 18 and performs the driver assistance features by generating accelerating force, decelerating force, and/or steering force to steer the vehicle wheels. The driving assistance features assist the driver automatically or semi-automatically with driving the vehicle safely so as to approach the target behavior. As shown in FIG. 3, the vehicle actuators 18 include a throttle 42 of an engine, a brake 44 of wheels, and a steering 46 of front wheels. For an electric or a hybrid vehicle, the throttle 42 may be alternatively understood as a power controller to accelerate rotation of motors linked to the wheels.

Depending on the target behavior, the vehicle target operation module 30 may further control the HMIs 20 at the same time or prior to actuating the vehicle actuators 18. The HMIs 20 notifies the driver of a possible safety concern or notifies the driver of whether and how the driver assistance feature is working. The HMIs 20 include a display for providing a visible alert, a speaker for providing an audible alert, and a vibration motor for providing a haptic alert to the driver.

The activation module 32 determines whether the driver has activated the driver assistance features. The driver may activate or deactivate each of the driver assistance features individually via the activation switch 22 which may be disposed at the steering wheel. When the activation switch 22 is turned on, the activation module 32 determines that the driver has activated the driving assistant features. The activation module 32 informs the vehicle target operation module 30 to activate the driving assistance features. Conversely, when the activation switch 22 is turned off, the activation module 32 determines that the driver has not activated the driving assistant features. The activation module 32 informs the vehicle target operation module 30 not to activate the driver assistance features unless the DSM 24 determines the abnormal situation as describe below. That is, even when the activation switch 22 is turned off, the driver assistance features are activated automatically if the DSM 24 determines the abnormal situation. The activation module 32 has a flag indicating how the driver assistance feature is activated. The flag "0" indicates the status is initialized. The flag "1" indicates the driver assistance feature is activated manually by the driver via the activation switch 22. The flag "2" indicates the driver assistance feature is activated automatically by the system based on the driver status.

Figure 4:
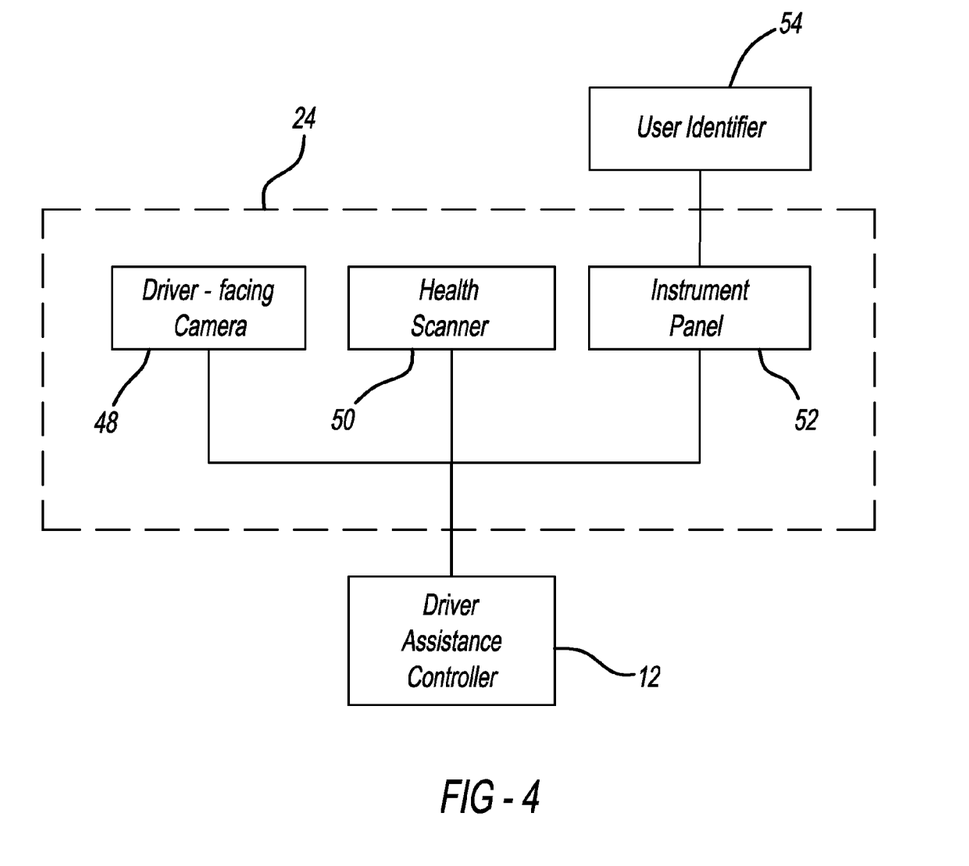
FIG. 4 is a block diagram of a driver status monitor (DSM)

The driver status module 34 receives driver status data from the DSM 24 to determine the abnormal situation. The DSM 24 is installed in the vehicle cabin to monitor the driver. As shown in FIG. 4, the DSM 24 employs one or more activity sensors such as a driver-facing camera 48, a health scanner 50, and an instrument panel 52 to monitor activities performed by the driver. Based on the activity sensors 48, 50, and 52, the driver status module 34 determines whether the driver is, for example, distracted, sick, or drowsy as the abnormal situation.

The driver-facing camera 48 may be mounted at the meter console to capture the driver's face, especially the driver's eyes. The driver status module 34 processes data received from the driver-facing camera 48 and monitors whether the driver looks away from the road based on the driver's gaze direction. If the driver looks away, the driver status module 34 determines the abnormal situation. The driver status module 34 may also determine whether the driver is drowsy or alert based on how much the driver's eye opens and for how long.

The health scanner 50 may be mounted on the steering wheel or suitable location which the driver touches. The health scanner 50 scans the driver's heart beat. The driver status module 34 processes data received from the health scanner 50 and monitors whether the driver is suffering from a severe physical condition or episode, such as a heart attack based on the heart beat. If the driver is suffering from the serve physical condition or episode, the driver status module 34 determines an abnormal situation.

The instrument panel 52 may be mounted interior of the vehicle to control various vehicle systems. For example, the system includes an air conditioner, a music player, a video player, and a GPS navigator. The driver status module 34 processes data received from the instrument panel 52 and monitors whether the driver is distracted. For example, when the instrument panel 52 is being operated as the vehicle is traveling, the driver is involved in secondary tasks that are potentially distracting the driver. If the driver is distracted, the driver status module 34 determines the abnormal situation.

The instrument panel 52 may communicate with a user identifier 54 which detects a user operating the instrument panel 52. The user identifier 54 determines if the driver or a passenger sitting next to or behind the driver is operating the instrument panel 52. If the user identifier 54 indicates the user operating the instrument panel 52 is not the driver, the driver status module 34 does not determine the abnormal situation because the driver is not involved in the secondary task. Any kind of commonly known technologies to identify the operator could be employed, such as suggested in the published Japanese patent JP-A-2013-123934.

The driver assistance features performed by the driver assistance controller 12 include, for example, a pre-collision safety brake (PCS), an adaptive cruise control (ACC), a lane keeping assistance (LKA).

The PCS prevents the vehicle from hitting an object detected within the surrounding of the vehicle. When the environmental sensor 38, 38, 40 detect the object approaching the vehicle or a pedestrian crossing in front of the vehicle, the vehicle target operation module 30 calculates a time-to-collision (TTC) of the object. If the TTC falls below a predefined threshold, the vehicle target operation module 30 actuates the brake 44 to decelerate or stop the vehicle. This kind of driver assistance feature may also be known as a forward collision warning (FCW) which provides the alert to the driver without actuating the brake 42 automatically.

The ACC adjusts the speed of the vehicle so that the vehicle follows a preceding vehicle at a set distance. When the front-facing camera 36 or the millimeter-wave/laser radar 38 detects the preceding vehicle, the vehicle target operation module 30 calculates a distance to the preceding vehicle and a relative speed between the vehicle and the preceding vehicle. Depending on the distance and the relative speed, the vehicle target operation module 30 actuates the throttle 42 and/or the brake 44 to accelerate and/or decelerate the vehicle accordingly. This kind of safety function is also known as a full-speed-range ACC (FSRA) which is available in full speed range including a stop-and-go traffic situation.

The LKA keeps the vehicle in a traveling lane. When the front-facing camera 36 or the millimeter-wave/laser radar 38 detects lane markers, the vehicle target operation module 30 calculates a relative position of the vehicle in the traveling lane. If the vehicle departs from the traveling lane or gets close to the lane boundary, the vehicle target operation module 30 actuates the steering 43 to apply a small amount of counter-steering force. This kind of safety function is also known as a lane departure assistance (LDA), a lane departure warning (LDW), and a lane centering control (LCC).

Other driver assistance features, such as a cross traffic alert (CTA), a rear cross traffic alert (RCTA), a blind spot warning (BSW), a closing vehicle warning (CVW), and a traffic jam assistance (TJA) may be also applicable to the present disclosure.

While the driver assistance feature is activated, the driver assistance features may be cancelled or overridden depending on the driver's operation detected by the driver operation sensors 16. When the depression degree of the acceleration/brake pedals or the operation torque of the steering wheel exceeds a predefined threshold, the driver override module 28 determines that the driver is actively operating the vehicle. Then, the driver takes over the vehicle control from the driver assistance features.

Next, the process and the operation of the ADAS 10 will be described with reference to the flowchart shown in FIGS. 5-10.

Figure 5:
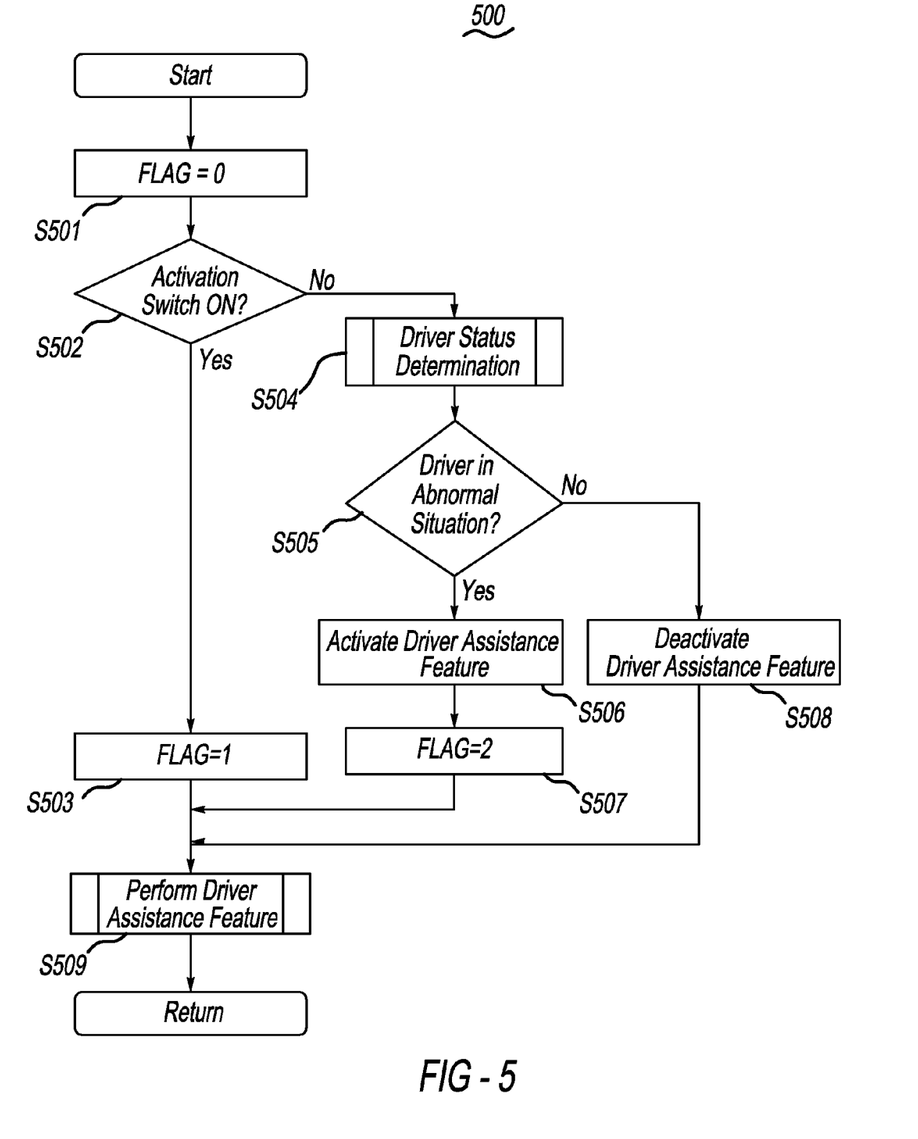
FIG. 5 is a flowchart depicting steps for activating a driver assistance feature of the ADAS.

FIG. 5 shows a flowchart for a routine 500 that activates the driver assistance features. The routine 500 begins immediately after the vehicle system is started up (by ignition on). Firstly, the routine 500 sets a flag to "0" to initialize the status at step 501 and determines whether the activation switch 22 is turned on by the driver in step 502. If the activation switch 22 is turned on (S502: Yes), the routine 500 sets a flag to "1" at step 503. If the activation switch 22 is not turned on (S502: No), then a driver status determination is executed in step 504. At step 505, the routine 500 determines whether the abnormal situation is determined. If the abnormal situation is determined (S505: Yes), the routine 500 activates the driver assistance features automatically at step 506 and subsequently sets the flag to "2" at step 507. Conversely, if the abnormal situation does not exist or is no longer detected (S505: No), the routine verifies the driver assistance features is deactivated or suppressed automatically at step 508. In other words, if the driver assistance feature was previously activated due to the abnormal situation, the driver assistance feature is deactivated at step 508 because the driving safety feature is no longer needed. After the flagging at steps 503 and 507, the driver assistance features are performed at step 509. The routine 500 returns to step 501 and repeats until the vehicle system is shut down.

Figure 6:
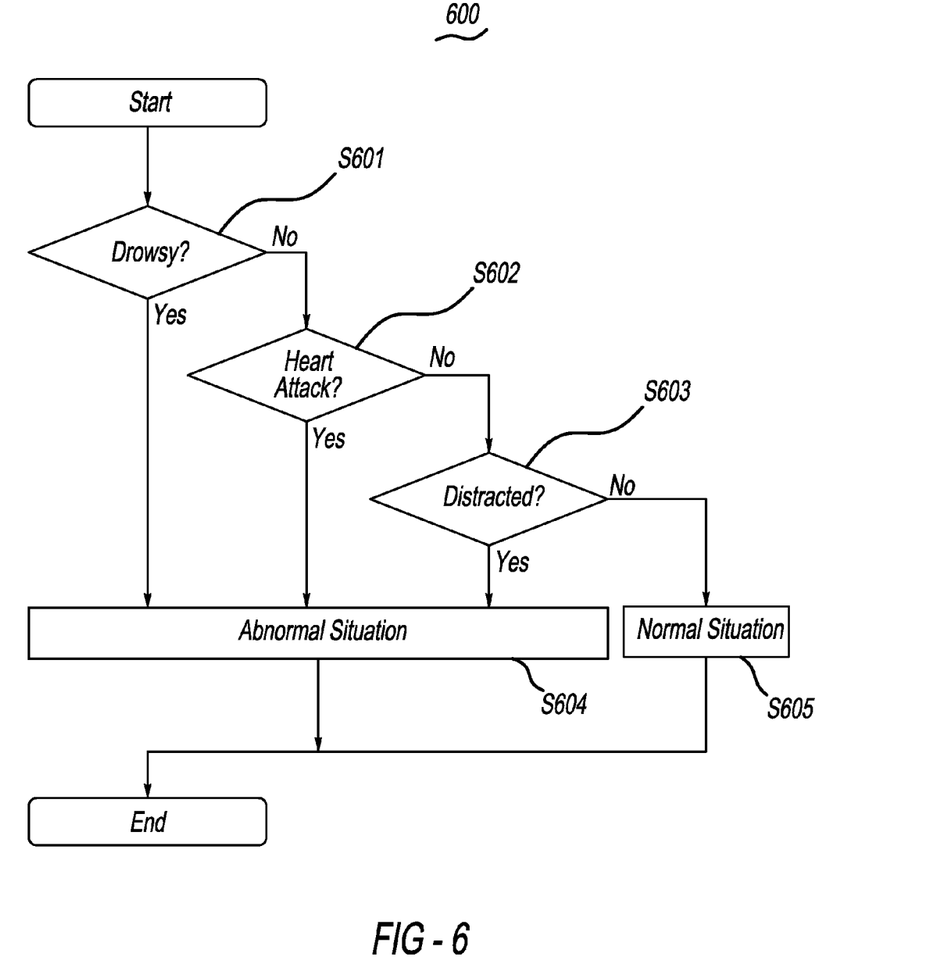
FIG. 6 is a flowchart depicting steps for determining an abnormal situation.

FIG. 6 shows a flowchart for a routine 600 that determines a driver status which is executed at step 504 in FIG. 5. The determination of the driver status 600 determines whether the driver is undergoing the abnormal situation based on the DSM 24. At step 601, the routine 600 determines whether the driver is drowsy. For example, data from the driver-facing camera 36 is used to determine whether the driver is drowsy. At step 602, the routine 600 determines whether the driver is suffering from a severe physical condition or episode, such as heart attack. For example, data from the health scanner 50 is used to determine whether the driver is suffering from the severe physical condition. At step S603, the routine 600 determines whether the driver is distracted. For example, data from the instrument panel 52 and the user identifier 54 is used to determine whether the driver is involved in secondary tasks that are potentially distracting. If at least one of the criteria described above is satisfied (S601, S602, S603: Yes), the abnormal situation is determined in step 604 and then the routine 600 goes to the end. If none of the criteria is met then, there is no abnormal situation and the routine 600 determine as a normal situation at step 605 and then the routine 600 goes to the end.

Figure 7:
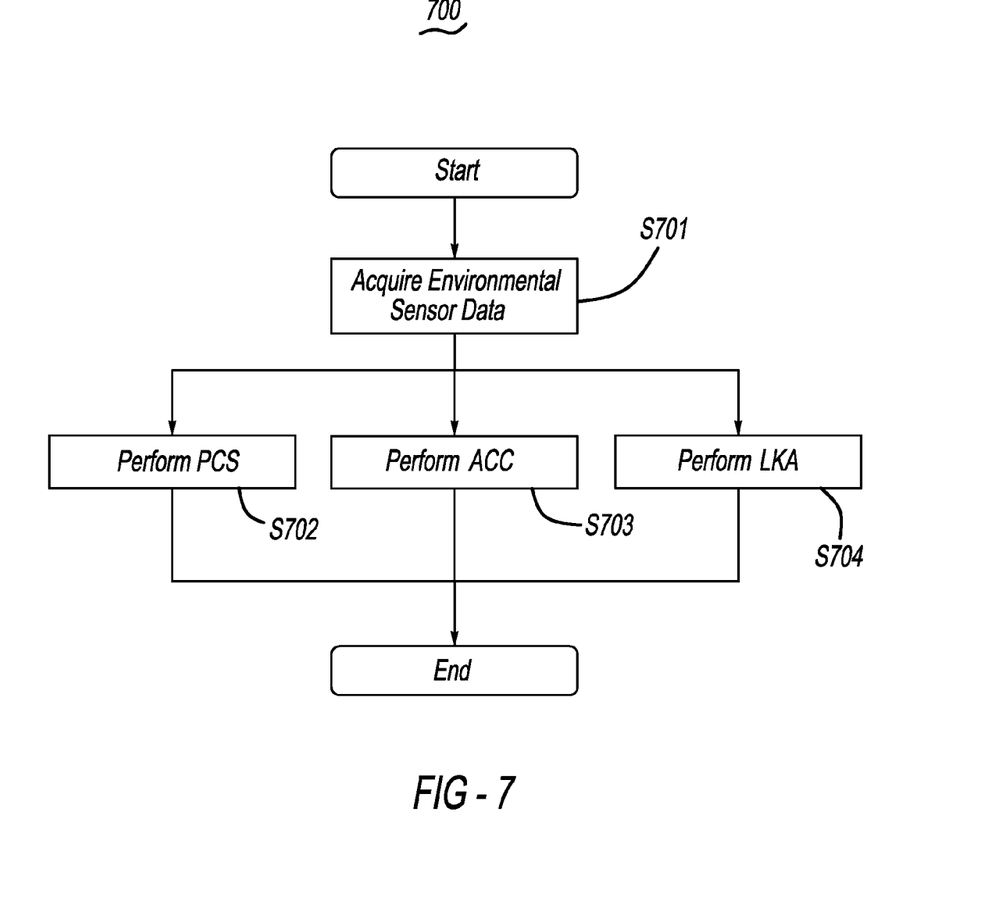
FIG. 7 is a flowchart depicting steps for performing driver assistance features.

FIG. 7 shows a flowchart for a routine 700 that performs the driver assistance features which is executed at step 509 in FIG. 5. At step 701, the routine acquires the environmental data from the environmental sensors 36, 38, and 40. Subsequently, the routine 700 performs the driver assistance features such as PCS, ACC, and/or LKA selectively or simultaneously at steps 702, 703, and 704 and the routine 700 goes to the end.

Figure 8:
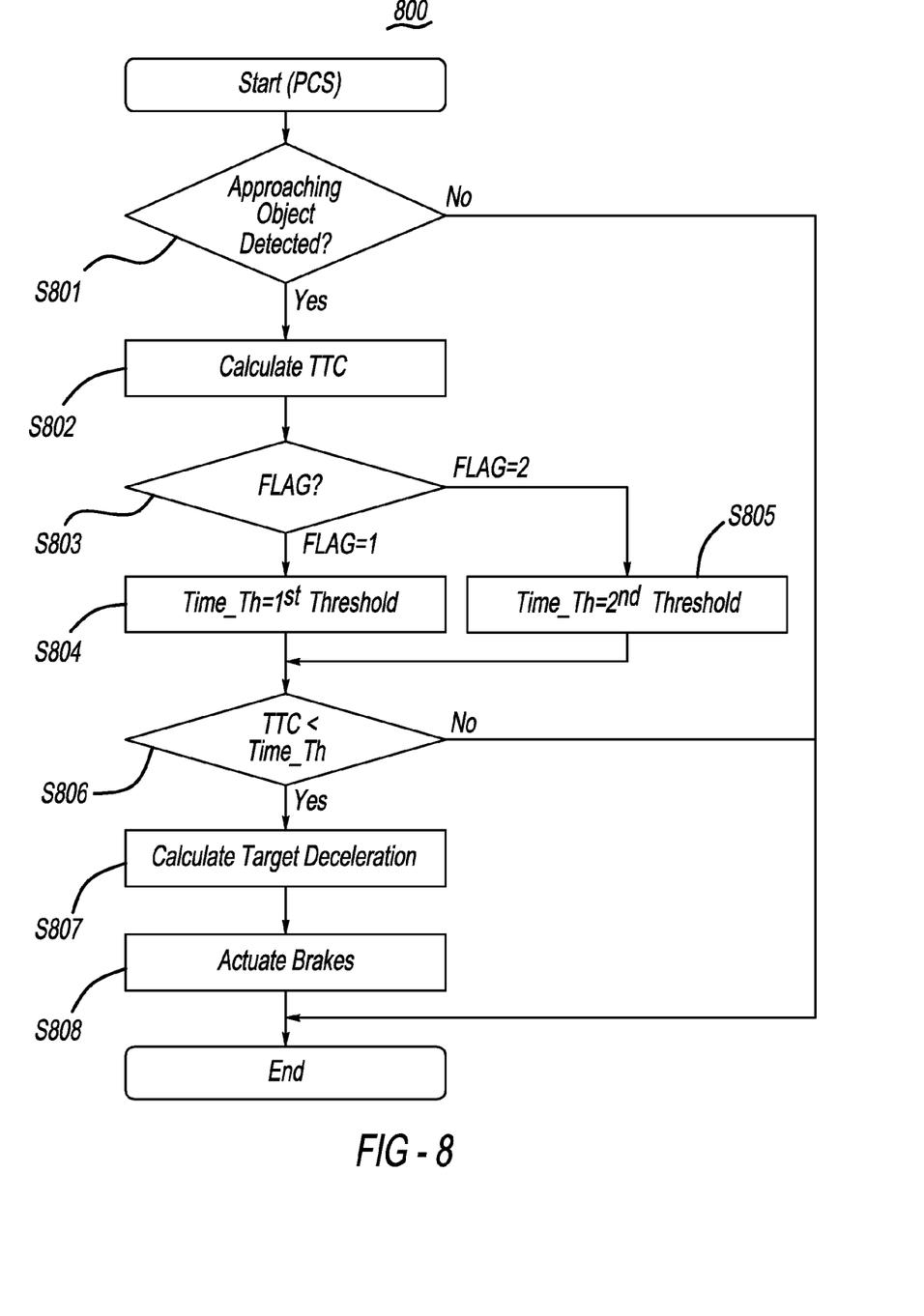
FIG. 8 is a flowchart depicting steps for pre-collision driver assistance (PCS)

FIG. 8 shows a flowchart for a routine 800 that performs the PCS which is executed at step 702 in FIG. 7. At step 801, the routine 800 determines whether the approaching object is detected based on the environmental sensors 14. If the approaching object is detected (S801: Yes), the routine 800 calculates a time-to-collision (TTC) at step 802. The routine 800 determines whether the flag is set to "1" or "2" at step 803. If the flag is set to "1", a time threshold (Time_Th) is set to a first threshold at step 804. If the flag is set as "2", the time threshold (Time_Th) is set to a second threshold longer than the first threshold at step 805. The routine 800 determines whether to trigger the actuation of the brake 44 by comparing the TTC with the time threshold at step 806. If the TTC falls below the time threshold (S806: Yes), the routine 800 calculates a target deceleration required to avoid colliding with the approaching object at step 807. Subsequently, the driver assistance controller 12 controls the brake 44 to generate the target deceleration at step 808 and then the routine 800 goes to the end. If the approaching object is not detected (S801: No) or the TTC does not fall below the time threshold (S806: No), the routine 800 goes to the end and returns to step S501 in FIG. 5.

Figure 9:
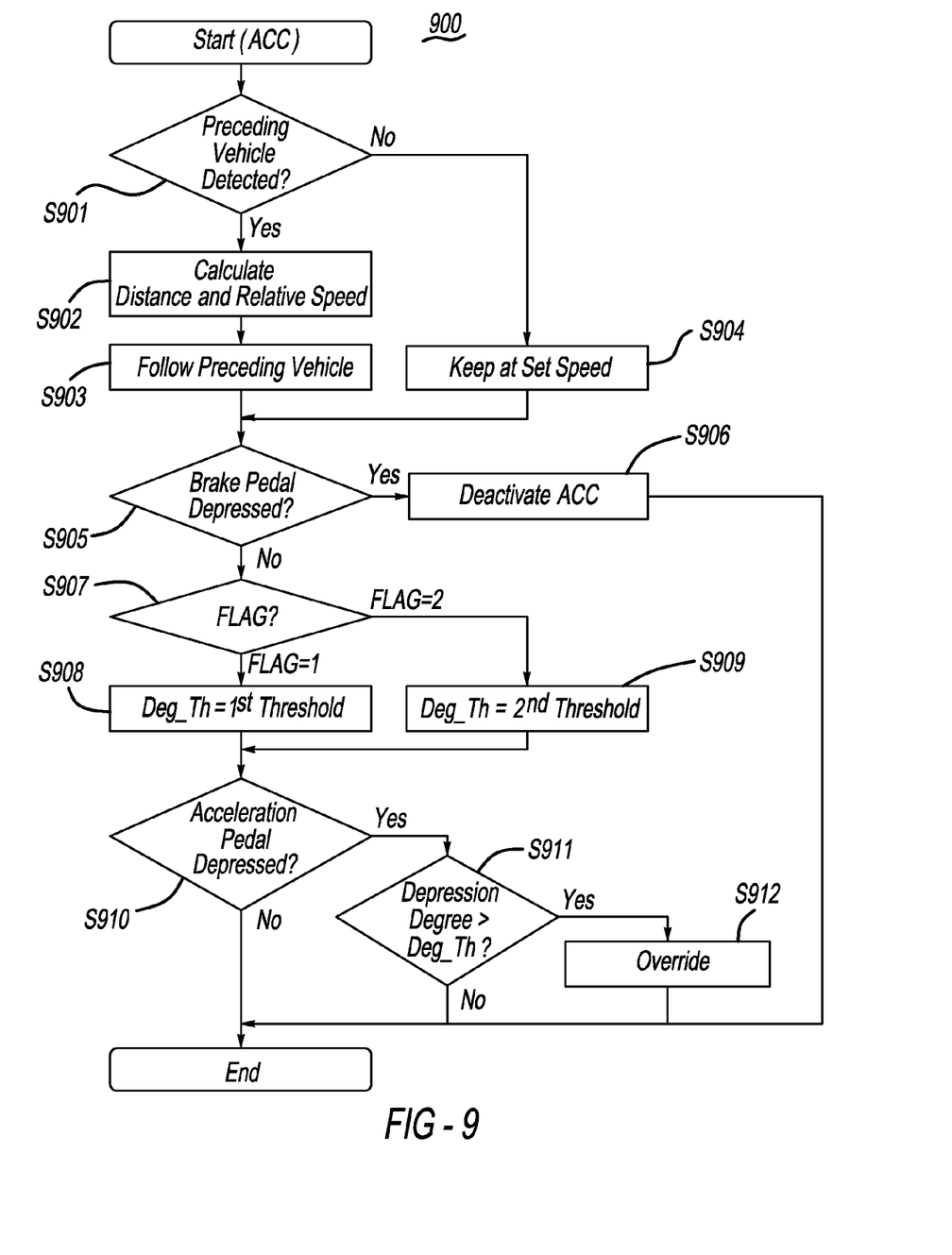
FIG. 9 is a flowchart depicting steps for adaptive cruise control (ACC)

FIG. 9 shows a flowchart for a routine 900 that performs the ACC which is executed at step 703 in FIG. 7. At step 901, the routine 900 determines whether the preceding vehicle is detected based on the environmental sensors 14. If the preceding vehicle is detected (S901: Yes), the routine 900 calculates the distance to the preceding vehicle and the relative speed between the subject vehicle and the preceding vehicle at step 902. Subsequently, the driver assistance controller 12 controls the throttle 42 and the brake 44 to follow the preceding vehicle at the set distance based on the distance and the relative speed at step 903 and then the routine 900 goes to step 905. Conversely, if the preceding vehicle is not detected (S901: No), the driver assistance controller 12 controls the throttle 42 and the brake 44 to keep the subject vehicle at the set speed in step 904 and then the routine goes to step 905. At step 905, the routine 900 determines whether the brake pedal is depressed by the driver. If the brake pedal is depressed (S905: Yes), the ACC is deactivated automatically at step 906 and then the routine 900 goes to the end and returns to S501 in FIG. 5. Conversely, if the brake pedal is not depressed by the driver (S905: No), the routine 900 determines whether the flag is set to "1" or "2" at step 907. If the flag is set to "1", a degree threshold is set to a first threshold at step 908. If the flag is set to "2", the degree threshold is set to a second threshold higher than the first threshold at step 909. The routine 900 determines whether the acceleration pedal is depressed by the driver based on the acceleration pedal sensor at step 910. Subsequently, if a depression degree of the acceleration pedal is greater than the degree threshold at step 911, the ACC is overridden by the driver's operation at step 912 and then the routine 900 goes to the end. If the acceleration pedal is not depressed (S910: No) or the depression degree is not greater than the degree threshold (S911: No), the routine 900 goes to the end and returns to step S501 in FIG. 5.

Figure 10:
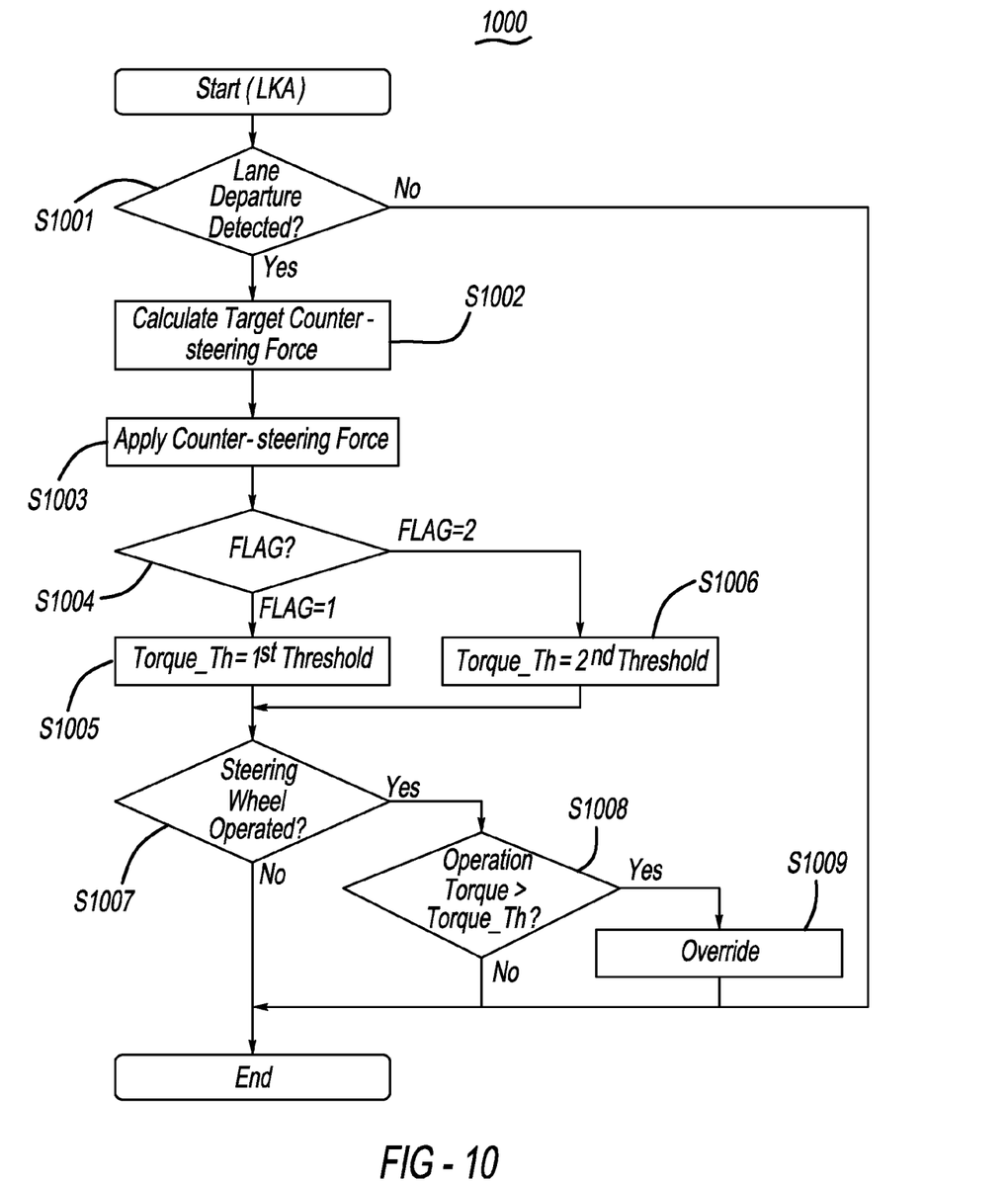
FIG. 10 is a flowchart depicting steps for lane keeping assistance (LKA).

FIG. 10 shows a flowchart for a routine 1000 that performs the LKA which is executed at step 704 in FIG. 7. At step 1001, the routine 1000 determines whether the lane departure is detected based on the environmental sensors 14. If the lane departure is detected (S1001: Yes), the routine 1000 calculates the target counter-steering force at step 1002. Conversely, if the lane departure is not detected (S1001: No), the routine 1000 goes to the end and returns to S501 in FIG. 5. Subsequently, the driver assistance controller 12 controls the steering 46 to apply a counter-steering force required to keep the vehicle in the traveling lane at step 1003. At step 1004, the routine 1000 determines whether the flag is set to "1" or "2". If the flag is set to "1", a torque threshold is set to a first threshold at step 1005. If the flag is set to "2", the torque threshold is set to a second threshold higher than the first threshold at step 1006. The routine 1000 determines whether the steering wheel is rotated by the driver at 1007. Subsequently at step 1008, if the operation torque of the steering wheel is greater than the torque threshold, the LKA is overridden by the driver's operation at step 1009. If the steering wheel is not operated (S1007: No) or the operation torque is not greater than the torque threshold (S1008: No), the routine 1000 goes to the end and returns to S501 in in FIG. 5

In the present disclosure described above, the driver assistance features such as PCS, ACC, and/or LKA are automatically activated when the driver is undergoing the abnormal situation. That is, under the abnormal situation, the driver assistance controller can perform the driver assistance features even if the driver deactivates each of the driver assistance features individually via the activation switch 22. Once the abnormal situation is no longer detected, the driver assistance feature is deactivated again or suppressed automatically. Therefore, it is possible for the driver to avoid accidents during the driver is in the abnormal situation.

In the routine 800 performing the PCS, the driver assistance controller 12 determines whether to actuate the brakes 44 by comparing time-to-collision (TTC) with a time threshold. Here, the time threshold is set longer than that of when the abnormal situation is not determined. That is, the driving assistance controller 12 actuates the brakes 44 earlier in the abnormal situation than usual. The driver in the abnormal situation may not be paying attention in front of the vehicle and thus not ready for a large braking force caused by the PCS. To make it early to actuate the brakes 44, the braking force can be small to save the driver from injury.

In addition, the driver override module 28 employs different thresholds for the abnormal situation which is higher than that for the normal situation. This is because the driver in the abnormal situation tends to operate the acceleration pedal, the brake pedal, and/or the steering wheel with in attention. That is, an override performed by the inattentive driver is difficult to be detected by the override module 28 to prevent overriding the driver assistance features unintentionally.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. An advanced driver assistance system of a vehicle for performing one or more driver assistance features, the system comprising:
    an environmental sensor detecting an environment surrounding the vehicle;
    a driver status monitor monitoring the driver and determining an abnormal situation of the driver;
    an activation switch operable by the driver for activating or deactivating the driver assistance features; and
    a driver assistance controller performing the one or more driver assistance features for controlling the vehicle based on a target behavior, wherein the target behavior is defined based on the environment surrounding the vehicle;
    wherein:
        the driver assistance controller activates the driver assistance features when the driver status monitor detects the abnormal situation with the activation switch set to deactivate;
        the driver status monitor detects an operation of an instrument panel disposed in the vehicle, to determine whether the driver is distracted by being involved in secondary tasks as the abnormal situation; and
        the instrument panel is equipped with a user identifier which determines if the driver or a passenger other than the driver in the vehicle is operating the instrument panel, the driver status monitor does not determine the abnormal situation when the user identifier detects that the passenger is operating the instrument panel.

2. The advanced driver assistance system of claim 1, wherein the driver assistance controller deactivates the driver assistance features when the abnormal situation is no longer determined.

3. The advanced driver assistance system of claim 1, wherein the driver status monitor includes a driver-facing camera which captures a driver's face to determine whether the driver is drowsy as the abnormal situation.

4. The advanced driver assistance system of claim 1, wherein the driver status monitor includes a health scanner which scans a driver's heart beat to determine whether the driver is suffering from a severe scrvc physical condition as the abnormal situation.

5. The advanced driver assistance system of claim 1, wherein the one or more driver assistance features include a pre-collision safety system which prevents the vehicle from hitting an object detected within the environment surrounding of the vehicle.

6. The advanced driver assistance system of claim 5, wherein the driver assistance controller determines whether to decelerate the vehicle by comparing time-to-collision with a time threshold, the time threshold is set longer when the driver status monitor determines the abnormal situation than when the driver status monitor does not determine the abnormal situation.

7. The advanced driver assistance system of claim 1, wherein the one or more driver assistance features include an adaptive cruise control which adjusts speed of the vehicle so that the vehicle follows a preceding vehicle at a set distance.

8. The advanced driver assistance system of claim 7, wherein the driver assistance controller determines whether to override the adaptive cruise control by comparing a depression of an acceleration pedal and a degree threshold, the degree threshold is set higher when the driver status monitor determines the abnormal situation than when the driver status monitor does not determine the abnormal situation.

9. The advanced driver assistance system of claim 1, wherein the one or more driver assistance features include a lane keeping assistance which keeps the vehicle in a traveling lane.

10. The advanced driver assistance system of claim 9, wherein the driver assistance controller determines whether to override the lane keeping assistance by comparing an operation torque of a steering wheel and a torque threshold, the torque threshold is set higher when the driver status monitor determines the abnormal situation than when the driver status monitor does not determine the abnormal situation.

11. An advanced driver assistance system of a vehicle for performing one or more driver assistance features, the system comprising:
   an environmental sensor detecting an environment surrounding the vehicle;
   a driver status monitor monitoring the driver and determining an abnormal situation of the driver;
   an activation switch operable by the driver for activating or deactivating the driver assistance features; and
   a driver assistance controller performing the one or more driver assistance features for controlling the vehicle based on a target behavior, wherein the target behavior is defined based on the environment surrounding the vehicle;
   wherein:
      the driver assistance controller activates the driver assistance features when the driver status monitor detects the abnormal situation with the activation switch set to deactivate;
      the one or more driver assistance features include an adaptive cruise control which adjusts speed of the vehicle so that the vehicle follows a preceding vehicle at a set distance; and
      the driver assistance controller determines whether to override the adaptive cruise control by comparing a depression of an acceleration pedal and a degree threshold, the degree threshold is set higher when the driver status monitor determines the abnormal situation than when the driver status monitor does not determine the abnormal situation.

12. An advanced driver assistance system of a vehicle for performing one or more driver assistance features, the system comprising:
   an environmental sensor detecting an environment surrounding the vehicle;
   a driver status monitor monitoring the driver and determining an abnormal situation of the driver;
   an activation switch operable by the driver for activating or deactivating the driver assistance features; and
   a driver assistance controller performing the one or more driver assistance features for controlling the vehicle based on a target behavior, wherein the target behavior is defined based on the environment surrounding the vehicle;
   wherein:
      the driver assistance controller activates the driver assistance features when the driver status monitor detects the abnormal situation with the activation switch set to deactivate;
      the one or more driver assistance features include a lane keeping assistance which keeps the vehicle in a traveling lane; and
      the driver assistance controller determines whether to override the lane keeping assistance by comparing an operation torque of a steering wheel and a torque threshold, the torque threshold is set higher when the driver status monitor determines the abnormal situation than when the driver status monitor does not determine the abnormal situation.

* * * * *

UNITED STATES PATENT AND TRADEMARK OFFICE
CERTIFICATE OF CORRECTION

| | | |
|---|---|---|
| PATENT NO. | : 9,308,914 B1 | Page 1 of 1 |
| APPLICATION NO. | : 14/603521 | |
| DATED | : April 12, 2016 | |
| INVENTOR(S) | : Bo Sun et al. | |

It is certified that error appears in the above-identified patent and that said Letters Patent is hereby corrected as shown below:

Claims

At column 9, claim number 4, line number 12, after "severe", delete "scrvc".

Signed and Sealed this
Seventh Day of June, 2016

Michelle K. Lee
*Director of the United States Patent and Trademark Office*